Patented July 5, 1927.

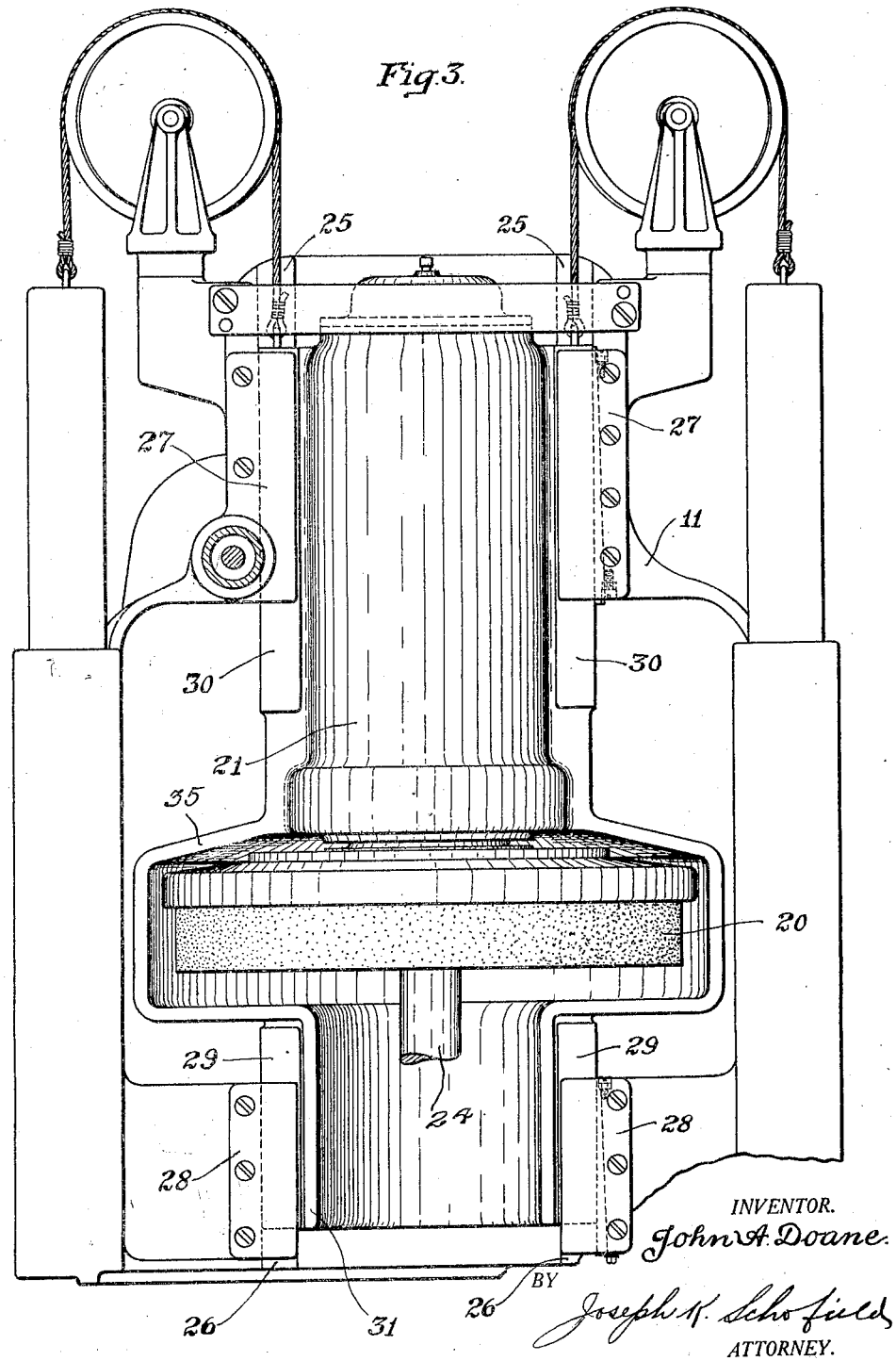

1,634,402

UNITED STATES PATENT OFFICE.

JOHN A. DOANE, OF HARTFORD, CONNECTICUT, ASSIGNOR TO PRATT & WHITNEY COMPANY, OF NEW YORK, N. Y., A CORPORATION OF NEW JERSEY.

WHEEL HEAD FOR MACHINE TOOLS.

Application filed November 2, 1923. Serial No. 672,397.

This invention relates to machine tools and in particular to surface grinding and milling machines in which a slidably mounted head is used to support a rotatable cutting wheel.

A principal object of the present invention is to provide improved means for slidably supporting the head carrying the cutting wheel particularly to increase the rigidity of its support.

One feature which enables me to accomplish the above object is that a wheel head of special form is provided in which two sets of guides are mounted at widely spaced positions. The additional or supplemental guides are spaced from those usually provided on wheel heads for machines of this type but preferably in alignment therewith and are placed on the opposite side of the wheel.

Another feature which is advantageous is that the wheel head is formed integrally of one member, portions of which substantially surround and enclose the rear portions of the wheel, two spaced apart sets of guides being provided in these two portions and serving to support the head more rigidly than in machines now in common use.

Another object of the invention is to provide co-acting means on the column of the machine which have corresponding aligned guiding ways suitably spaced apart and adapted to engage the guides on the wheel head.

With these and other objects in view, my invention consists in the features of construction and operation set forth in the following specification and illustrated in the accompanying drawings.

In the accompanying drawings, I have shown my invention embodied in a surface grinding machine but it will be understood that the invention can be otherwise embodied and that the drawings are not to be construed as defining or limiting the scope of the invention, the claims appended to this specification being relied upon for that purpose.

In the drawings annexed hereto and forming a part of this specification:

Fig. 3 is a front elevation of a portion of the machine showing the principal parts of the present invention.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: first, a base having thereon a work supporting table; second, a column secured rigidly to the said base; third, a wheel head slidably mounted in suitable ways provided on said column; fourth, a wheel rotatably mounted upon the wheel head; fifth, a pair of guides formed upon laterally extending projections of said wheel head; and sixth, a depending projection formed on said wheel head also having laterally extending guides, this latter projection and the guides formed thereon being positioned below the rotatable wheel.

Figure 1:
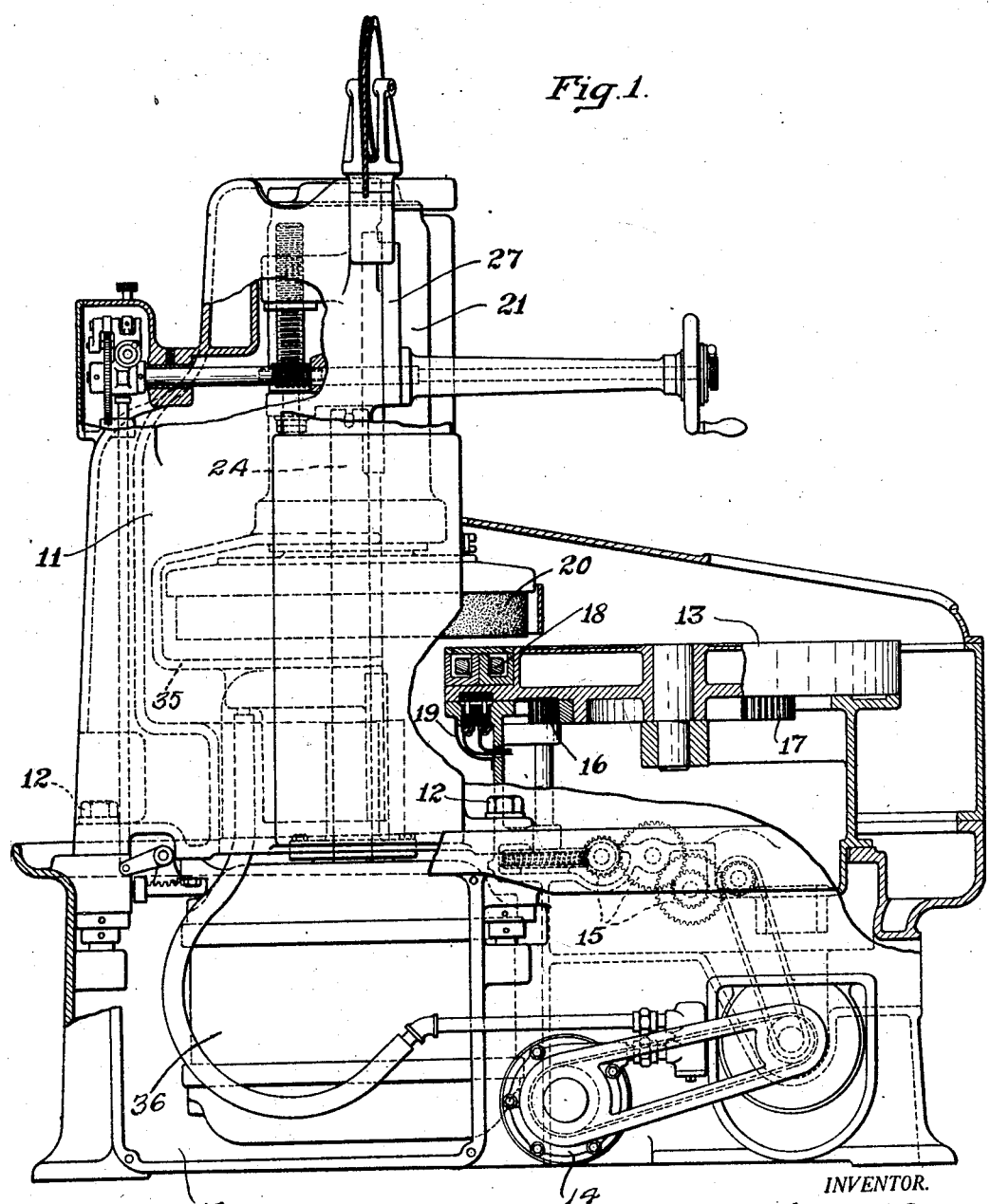
Figure 1 is a side elevation of a complete surface grinding machine, parts being shown in section to more completely disclose their construction.
Figure 2:
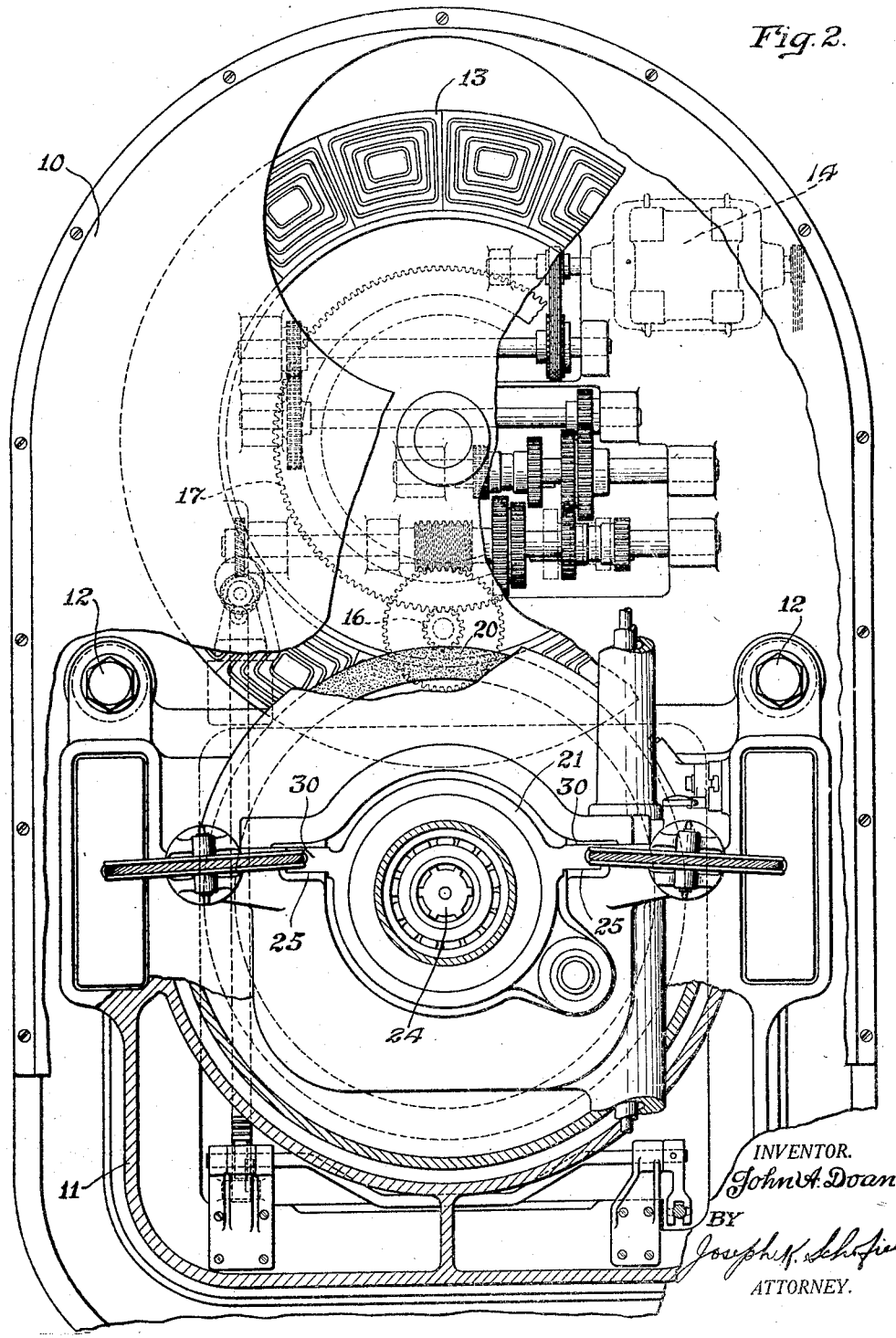
Fig. 2 is a plan view of the complete machine also having parts shown in section.

Referring more in detail to the figures of the drawings, the surface grinding machine shown in the drawings comprises a base 10, on which is rigidly secured a column 11 as by means of the bolts 12 shown in Figs. 1 and 3. Mounted upon a horizontal surface within the base is the work support 13. In the particular embodiment illustrated, this work support 13 is rotatable and preferably may be driven from a motor 14 housed within the base 10 through driving connections 15 including a pinion 16 in engagement with a spur gear 17 on the lower surface of the work support. This work support 13 also may be provided with a plurality of independent chucks 18, each chuck subtending a small portion only of the periphery of the work table 13. These independent chucks 18 which preferably are of the magnetic type are adapted to be successively magnetized and de-magnetized by electrical connections 19 shown partially in Fig. 1. As these members above described form no direct part of the present invention, it is not thought that a further description of them is required.

Adapted to be adjusted so that it may operate upon work placed upon the work table 13 is an abrasive wheel 20. This wheel 20 is carried in a wheel head 21 of special construction permitting it to be supported so that it may slide freely but being prevented from distorting its shape due to strains imposed upon it during operation. For this purpose, the head 21 carrying the rotatable wheel 20 is elongated vertically and provided with independent widely spaced guides located on opposite sides of the wheel 20, that is, above and below the abrasive surface of the wheel. As is usual in machines of this type, the wheel 20 is mounted upon the lower end of a vertical spindle within the head 21. Also the usual vertical guides are provided on the head on opposite sides of the head portion. The particular improvement of the wheel carrying head 21 over the prior art is that a supplementary portion is formed on the head extending below the wheel 20. This supplementary portion is integral with the main portion of the head and connected thereto by a web portion 35 surrounding a large portion of the wheel 20. Guides on each side of both the main and supplemental parts of the head 21 give bearings upon widely spaced areas so that the head 21 is of a more rigid form than those of the prior art and thus can be rigidly supported while permitted to slide freely. Driving means for the wheel 20 and its spindle may be provided within the base 10. As shown in Fig. 1, the motor 36 is provided which is attached to the spindle for the wheel 20 by means of a connecting shaft 24. This shaft preferably permits sliding movement between itself and the wheel spindle so that adjustments of the wheel head 21 may be made while rotating means for the wheel are maintained.

Upon front vertical surfaces of the column 11 are planed ways 25 and 26 which are in alignment with each other. These ways 25 and 26 are widely spaced apart, one pair 25 being above the portion of the column 11 at which the wheel 20 operates and which corresponds to those usually provided in machines of the present type. The other pair of ways 26 is below the plane of the wheel 20. Clamping strips 27 and 28 are provided to suitably enclose the corresponding guides provided on the wheel head 21.

The wheel head 21 as shown most clearly in Fig. 3 comprises an integral member having a depending extension substantially enclosing the rear portions of the wheel 20, and, in addition to the housing for the wheel spindle it is provided with a projection 31 extending below the wheel 20. This projection 31 is provided with guides 29 in alignment with guides 30 provided in the upper portions of this wheel head 21. With the wheel head 21 formed as above, it is guided not only by the guides 30 above the wheel 20 operating on the ways 25 as is now the usual custom but is also guided by the supplemental pair of guides 29 directly in alignment with the first named guides and on the opposite side of the wheel 20.

By reason of this construction, the supporting means for the wheel head 21 are not such that the wheel head 21 is overhung from one set of ways at the point where the maximum pressure of the work against the wheel is produced, but is at all times rigidly supported on opposite sides. The wheel head 21 is therefore freed from the tendency to distort or twist out of proper position due to this pressure.

What I claim is:

1. A machine tool comprising in combination, a frame, a work support, a rotatable cutting wheel, a wheel head for slidably supporting and guiding said wheel, said head comprising upper and lower portions each having guides cooperating with corresponding guide ways provided on the machine tool frame whereby the wheel head is rigidly but slidably supported on said frame at widely spaced portions.

2. A machine tool comprising in combination, a frame, a work support and a cutting wheel, a wheel head for slidably supporting and guiding said wheel, said head comprising a housing substantially enclosing a portion of the wheel and having extensions formed thereon on opposite sides of the wheel, and guides formed on each of these extensions adapted to engage corresponding guide ways on the machine tool frame whereby said head will be rigidly supported on said frame while permitted to slide freely.

3. A machine tool comprising in combination, a base, a work support thereon, a column, a wheel head slidably mounted thereon, a rotatable cutting wheel mounted in said head, projections extending laterally therefrom and provided with guides adapted to engage corresponding guideways formed on the column, and a depending projection formed integrally on said head and surrounding a portion of said wheel, said depending projection having lateral portions forming guides adapted to engage supplemental guideways also formed on the column.

4. A surface grinding machine comprising in combination, a base, a column thereon, a wheel head slidably mounted on said column and having a rotatable wheel therein, said head having integrally formed guides spaced from each other respectively above and below the wheel, and guiding ways corresponding therewith formed on said column whereby the wheel head will be guided and rigidly supported on said column.

In testimony whereof, I hereto affix my signature.

JOHN A. DOANE.